Oct. 29, 1929.  M. LUBICH  1,733,162

ECCENTRIC PRESS

Filed Oct. 29, 1928

Inventor:
Max Lubich
by [signature]
Atty.

Patented Oct. 29, 1929

1,733,162

UNITED STATES PATENT OFFICE

MAX LUBICH, OF EBERSBACH-ON-THE-FILS, GERMANY, ASSIGNOR TO THE FIRM L. SCHULER A.-G., OF GOPPINGEN, WURTTEMBERG, GERMANY

ECCENTRIC PRESS

Application filed October 29, 1928, Serial No. 315,907, and in Germany June 6, 1928.

My invention refers to coupling means and more especially to means whereby a cam, disc or other member can be fixed on a shaft or journal in any desired angular position and be held thereon securely. The invention is particularly useful in mounting cams or eccentrics on the shaft or journal of an eccentric press.

It is an object of my invention to provide coupling and fixing means of the kind aforesaid which allow a simpler and easier change of position of the part of be fixed on a shaft or journal.

In eccentric presses if the stroke of the press shall be varied the eccentric member or cam must be arranged for angular displacement on an eccentric part of the driving shaft. As a rule the displaceable eccentric member is coupled with the shaft by means of a clutch coupling, and if the eccentric member shall be displaced angularly it is shifted axially in order to disengage it from the shaft or journal.

According to the present invention the coupling, disengaging and shifting can be operated in a simpler and quicker manner.

In the drawings affixed to this specification and forming part thereof a device embodying my invention is illustrated diagrammatically by way of example.

Figure 1:
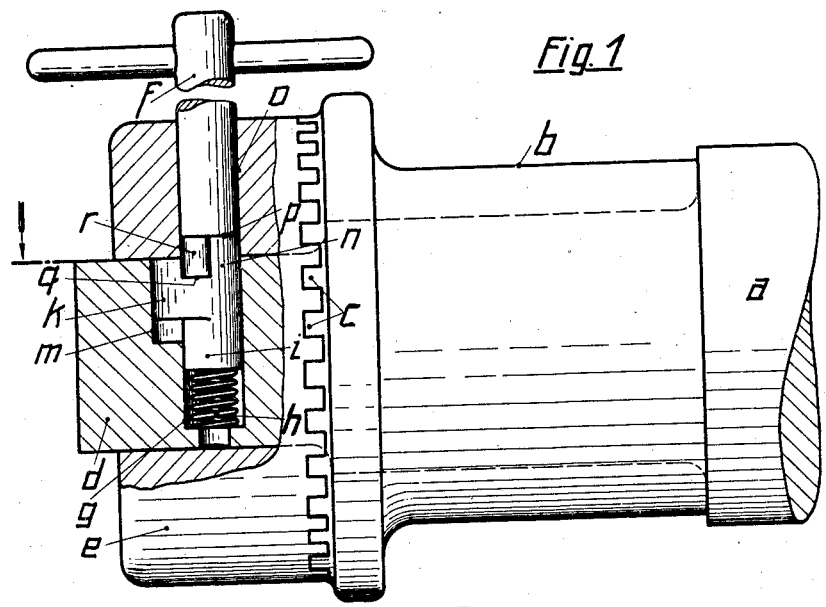
Fig. 1 is an elevation of part of a journal or shaft of an eccentric press with the eccentric member and part of the clutch shown in axial section.
Figure 3:
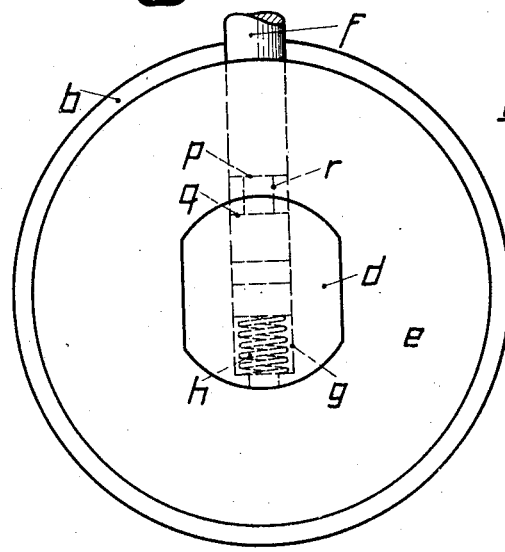
Fig. 3 is an end view.
Figure 2:
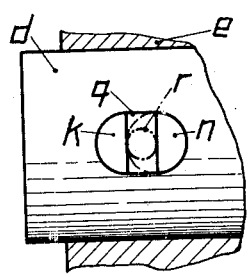
Fig. 2 is a cross-section on the line 2—2 in Fig. 1.

Referring to the drawings $a$ is a journal fixed eccentrically on the main driving shaft of the press. $b$ is the cam or eccentric member which would be freely rotatable about the journal $a$, save for the coupling member $e$ mounted on the reduced end $d$ of the journal and being provided with teeth $c$ entering the gaps between similar teeth on the outer face of the eccentric member $b$. The end $d$ of the journal $a$ has a non-circular cross-section and the coupling member $e$ has a boring of similar section fitting on the end $d$ of the journal, being thus prevented from rotating on the end $d$ of the journal.

Obviously, when the coupling member $e$ is shifted to the left, its teeth will be disengaged from the teeth of the cam member $b$ and this latter can then be displaced angularly on the journal. By shifting member $e$ to the right its teeth will enter the gaps between the teeth of the cam member and will lock same in its new position.

According to the present invention the shifting is effected by means of the key $f$ to be described more fully hereinafter and a shifting member $i$, $k$ mounted for rotation in a cylindrical radial boring $g$ of the part $d$, a coil spring $h$ being inserted between the bottom end of the cylindrical member $i$ and the bottom of the boring $g$. $k$ is a cam formed on the cylindrical member $i$ and $m$ is a lateral engagement of the cylindrical boring $g$, offering room for the cam $k$. The cavity $m$ is longer than the cam $k$ so that the member $i$, $k$ can be displaced axially in the boring $g$ and cavity $m$ against the action of spring $h$. At its top end the member $i$ carries a semi-cylindrical projection $n$ which can enter the radial boring $o$ of the coupling member $e$. The key $f$ is equipped with an eccentric pin $r$ projecting from its lower end $p$. When the key is inserted in the boring $o$ the pin extends into the space at the side of the semi-cylindrical extension $n$ and into a transverse groove $q$ in the cam $k$.

In the position shown in the drawings the extension $n$ of the locking member $i$ prevents the coupling member $e$ from being shifted to the left. If the key $f$ is inserted in the boring $o$ and is depressed against the action of spring $h$, the extension $n$ of member $i$ will be forced entirely into the boring $g$, whereby the coupling member $e$ is now free to be shifted to the left. On the key being now turned about it axis, its extension $r$ which is applied against the extension $n$ of the locking member $i$, will cause this member to rotate about its axis, whereby the cam $k$ is applied against the wall of the cavity $m$ and now serves as a pivot for the key $f$ and coupling member $e$, whereby this latter is shifted to the left. The cam member $b$ can now be freely turned on the journal $a$ and by turning key $f$ in the oposite direction the coupling member $e$ is returned into its initial position, whereby the member $b$ is fixed in position on the journal. Instead of using the key for returning the member $e$, it may also be withdrawn, and the coupling member $e$ pushed back into coupling position by hand.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. Means for coupling a shaft or journal with a member surrounding same, comprising a clutch mounted on said shaft or journal and secured thereon against angular displacement, but free to be displaced axially, said clutch being arranged to engage said member and having a radial boring, said shaft or journal having a corresponding radial boring and a laterally projecting cavity, a locking member in said boring, a cam on said locking member extending into said cavity and a key adapted to be inserted in the boring in said clutch and to project into the boring in said shaft or journal for operative engagement with said locking member.

2. Means for adjusting eccentric presses comprising a shaft or journal in said press, an eccentric mounted thereon for angular displacement, an extension of non-circular cross-section on said shaft or journal near said eccentric, a clutch fitted on said extension for free axial displacement, said clutch being arranged to engage said eccentric and having a radial boring, said extension having a corresponding radial boring and a cavity projecting laterally from said boring, a locking pin axially movable in said boring, a spring tending to force part of said locking pin into the radial boring of said clutch, a cam on said pin extending into said cavity in contact with a wall thereof and a key fitting in the boring in said clutch and projecting into the boring in said extension for operative engagement and rotation of said locking pin.

In testimony whereof I affix my signature.

MAX LUBICH.